US010782993B2

United States Patent
Rao et al.

(10) Patent No.: US 10,782,993 B2
(45) Date of Patent: Sep. 22, 2020

(54) SYSTEMS AND METHODS FOR SECURE RUNTIME DYNAMIC RESIZING OF MEMORY NAMESPACES

(71) Applicant: Dell Products L.P., Round Rock, TX (US)

(72) Inventors: Balaji Bapu Gururaja Rao, Austin, TX (US); Shekar Babu Suryanarayana, Bangalore (IN); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 15/783,011

(22) Filed: Oct. 13, 2017

(65) Prior Publication Data

US 2019/0114192 A1   Apr. 18, 2019

(51) Int. Cl.
| | |
|---|---|
| G06F 9/455 | (2018.01) |
| G06F 3/06 | (2006.01) |
| G06F 21/53 | (2013.01) |
| G06F 21/62 | (2013.01) |

(52) U.S. Cl.
CPC ........ *G06F 9/45558* (2013.01); *G06F 3/0604* (2013.01); *G06F 3/064* (2013.01); *G06F 3/0631* (2013.01); *G06F 3/0665* (2013.01); *G06F 21/53* (2013.01); *G06F 21/6218* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 7,502,803 B2 * | 3/2009 | Culter | ................... | G06F 9/4411 |
| 7,937,701 B2 * | 5/2011 | Kinney | ................... | G06F 9/544 |
| | | | | 713/300 |
| 9,459,907 B2 * | 10/2016 | Tsirkin | ................ | G06F 9/45558 |
| 9,792,172 B2 * | 10/2017 | Kanno | ................ | G06F 11/1008 |
| 9,830,079 B2 * | 11/2017 | Kanno | ................... | G11C 29/52 |
| 10,114,958 B2 * | 10/2018 | Sell | ..................... | G06F 12/1491 |

(Continued)

OTHER PUBLICATIONS

Dong, Yaozu, et al. "Extending Xen with Intel Virtualization Technology." Intel Technology Journal 10.3 (2006). (Year: 2006).*

*Primary Examiner* — Matthew J Brophy
(74) *Attorney, Agent, or Firm* — Jackson Walker L.L.P.

(57) ABSTRACT

In accordance with embodiments of the present disclosure, an information handling system may include a memory subsystem and a processor subsystem communicatively coupled to the memory subsystem and configured to execute a hypervisor, wherein the hypervisor is configured to host a plurality of virtual machines and host an interface to the memory subsystem, wherein the interface is configured to dynamically modify sizes of namespaces instantiated within the memory subsystem by maintaining super metadata associated with each of a plurality of memory modules of the memory subsystem, wherein the super metadata for a particular memory module of the memory subsystem includes one or more entries for the particular memory module, each entry defining a namespace of the particular memory module and recording an offset of the latest written data in the namespace.

18 Claims, 6 Drawing Sheets

(56) References Cited

U.S. PATENT DOCUMENTS

| | | | | |
|---|---|---|---|---|
| 10,176,116 | B2* | 1/2019 | Sternberg | G06F 9/45533 |
| 10,210,012 | B2* | 2/2019 | Sanjeepan | G06F 3/0619 |
| 10,228,874 | B2* | 3/2019 | Wysocki | G06F 9/45558 |
| 10,241,859 | B2* | 3/2019 | Kanno | G06F 11/1008 |
| 2005/0204357 | A1* | 9/2005 | Garg | G06F 9/4486 |
| | | | | 718/1 |
| 2010/0318609 | A1* | 12/2010 | Lahiri | G06F 9/455 |
| | | | | 709/205 |
| 2014/0298340 | A1* | 10/2014 | Imaizumi | G06F 12/0284 |
| | | | | 718/1 |
| 2015/0378921 | A1* | 12/2015 | Karippara | G06F 12/0888 |
| | | | | 710/308 |
| 2016/0371496 | A1* | 12/2016 | Sell | G06F 12/14 |
| 2016/0378623 | A1* | 12/2016 | Kumar | G06F 11/00 |
| | | | | 714/3 |
| 2017/0024276 | A1* | 1/2017 | Kanno | G06F 11/1008 |
| 2017/0329618 | A1* | 11/2017 | Tsirkin | G06F 8/65 |
| 2017/0371695 | A1* | 12/2017 | Sanjeepan | G06F 12/1009 |
| 2018/0004559 | A1* | 1/2018 | Geml | G06F 21/6209 |
| 2018/0004649 | A1* | 1/2018 | Puthiyedath | G06F 12/0238 |
| 2018/0011760 | A1* | 1/2018 | Kanno | H03M 13/05 |
| 2018/0032429 | A1* | 2/2018 | Liu | G06F 12/084 |
| 2018/0089101 | A1* | 3/2018 | Sternberg | G06F 9/45533 |
| 2018/0136867 | A1* | 5/2018 | Tsirkin | G06F 9/45545 |
| 2018/0165133 | A1* | 6/2018 | Iyigun | G06F 12/1036 |
| 2018/0188985 | A1* | 7/2018 | Wysocki | G06F 9/45558 |
| 2018/0203610 | A1* | 7/2018 | Krueger | G06F 9/467 |
| 2018/0239697 | A1* | 8/2018 | Huang | G06F 12/0246 |
| 2019/0102323 | A1* | 4/2019 | Durham | G06F 9/45558 |
| 2019/0258502 | A1* | 8/2019 | Sanjeepan | G06F 12/1009 |

\* cited by examiner

SYSTEMS AND METHODS FOR SECURE RUNTIME DYNAMIC RESIZING OF MEMORY NAMESPACES

TECHNICAL FIELD

This disclosure relates generally to virtualized information handling systems and more particularly to secure dynamic runtime dynamic resizing of memory namespaces.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, device management software, and memory. In some instances, services may be provided by other application software running on the information handling system, such as a database server.

One disadvantage of existing virtualized computing environments is that existing standards do not allow for a dynamic expansion or reduction of size of storage and memory namespaces (including, for example, persistent memory namespaces such as non-volatile dual-inline memory module (NVDIMM) namespaces), and typically, using exiting approaches, an administrator can only add and delete namespaces during runtime. Accordingly, if an administrator desires to increase the size of a namespace, then the administrator must delete the existing namespace and create a new namespace with increased size.

At runtime in a virtualization environment, if a virtual machine is running out of persistent NVDIMM storage space, no solutions presently exist to find requisite NVDIMM storage space and increase the virtual machine namespace without corrupting namespace attributes. In addition, using existing approaches, there is no way to dynamically shrink the unused space from already existing namespaces and accommodate the space to a virtual machine namespace which is in need of it.

From a namespace management perspective, frequent allocation and deallocation of namespaces results in memory fragmentation, rendering NVDIMMs unusable for namespace creation. To illustrate, the NVDIMM Namespace Specification provides a mechanism for subdividing NVDIMMs into namespaces which are logical units of storage. The specification provides namespaces which are either byte addressable, known as persistent memory namespaces, or block addressable, known as block namespaces. As per the specification, a persistent memory namespace is associated with an interleaved plurality of NVDIMMs. Also, an interleaved set of NVDIMMs may include at most one persistent memory namespace, and persistent memory namespace must exist at the beginning of an interleaved set's system physical address.

Also in accordance with the NVDIMM Namespace Specification, a block name space must be associated with only one NVDIMM. Also, the restriction that a persistent memory namespace must exist at the beginning of an interleaved set's system physical address implies that a block namespace may not exist at the beginning of an NVDIMM's system physical address.

As shown in FIG. 5, frequency allocation and deallocation of namespaces may result in memory fragmentation rending NVDIMMs unusable for namespace creation. In the example of FIG. 5, a persistent memory system may include two NVDIMMs (NVDIMM 1 and NVDIMM 2) each with eight gigabytes of persistent memory, meaning a total of 16 gigabytes of persistent memory in the system. A persistent memory namespace P1 of eight gigabytes may be created first, which is interleaved among NVDIMM 1 and NVDIMM 2). After that, two block namespaces (B11 and B21) of two gigabytes each may be created, leaving the memory system as shown on the left-hand side of FIG. 5.

After some time, persistent memory namespace P1 may be freed and new block namespaces B12 and B22 of three megabytes each may be created, leaving the memory system as shown on the right-hand side of FIG. 5. If a subsequent need arises for a namespace greater than three megabytes, such request will be denied as the remaining unused memory will not meet the specification requirements for creating the namespace, despite the fact that six megabytes of free space exists on the NVDIMMs, due to the fragmentation of the memory system.

SUMMARY

In accordance with the teachings of the present disclosure, the disadvantages and problems associated with memory fragmentation may be reduced or eliminated.

In accordance with embodiments of the present disclosure, an information handling system may include a memory subsystem and a processor subsystem communicatively coupled to the memory subsystem and configured to execute a hypervisor, wherein the hypervisor is configured to host a plurality of virtual machines and host an interface to the memory subsystem, wherein the interface is configured to dynamically modify sizes of namespaces instantiated within the memory subsystem by maintaining super metadata associated with each of a plurality of memory modules of the memory subsystem, wherein the super metadata for a particular memory module of the memory subsystem includes one or more entries for the particular memory module, each entry defining a namespace of the particular memory module and recording an offset of the latest written data in the namespace.

In accordance with these and other embodiments of the present disclosure, a method may include hosting on a hypervisor a plurality of virtual machines and hosting on the hypervisor an interface between a processor subsystem upon which the hypervisor executes and a memory subsystem communicatively coupled to the processor subsystem, wherein the interface is configured to dynamically modify sizes of namespaces instantiated within the memory subsystem by maintaining super metadata associated with each of a plurality of memory modules of the memory subsystem, wherein the super metadata for a particular memory module of the memory subsystem includes one or more entries for the particular memory module, each entry defining a namespace of the particular memory module and recording an offset of the latest written data in the namespace.

In accordance with these and other embodiments of the present disclosure, an information handling system may include a memory subsystem and a processor subsystem communicatively coupled to the memory subsystem and configured to execute a hypervisor, wherein the hypervisor is configured to host a plurality of virtual machines, a file system, a hardware driver interface to the memory subsystem, and a virtual namespace interposer interfaced between the file system and the hardware driver. The virtual namespace interposer may be configured to during an unfragmented state of the memory subsystem, pass through namespace creation requests and input/output requests to the memory subsystem and during a fragmented state of the memory subsystem: (i) in response to a request to create a new namespace, create the new namespace as a virtual namespace mapped to two or more physical block namespaces of the memory subsystem; and (ii) in response to an input/output request to the memory subsystem determine if the input/output request is to a virtual namespace, pass through the input/output request if the request is to a namespace other than a virtual namespace, and translate the input/output request to map the virtual namespace to the two or more physical block namespaces of the memory subsystem making up the virtual namespace if the input/output request is to a virtual namespace.

In accordance with these and other embodiments of the present disclosure, a method may include during an unfragmented state of a memory subsystem communicatively coupled to a processor subsystem configured to execute a hypervisor, wherein the hypervisor is configured to host a plurality of virtual machines, a file system, a hardware driver interface to the memory subsystem, and a virtual namespace interposer interfaced between the file system and the hardware driver. The method may also include during an unfragmented state of the memory subsystem, passing through, by the virtual namespace interposer, namespace creation requests and input/output requests to the memory subsystem. The method may further include during a fragmented state of the memory subsystem: (i) in response to a request to create a new namespace, creating, by the virtual namespace interposer, the new namespace as a virtual namespace mapped to two or more physical block namespaces of the memory subsystem; and (ii) in response to an input/output request to the memory subsystem determining, by the virtual namespace interposer, if the input/output request is to a virtual namespace, passing through, by the virtual namespace interposer, the input/output request if the request is to a namespace other than a virtual namespace, and translating, by the virtual namespace interposer, the input/output request to map the virtual namespace to the two or more physical block namespaces of the memory subsystem making up the virtual namespace if the input/output request is to a virtual namespace.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
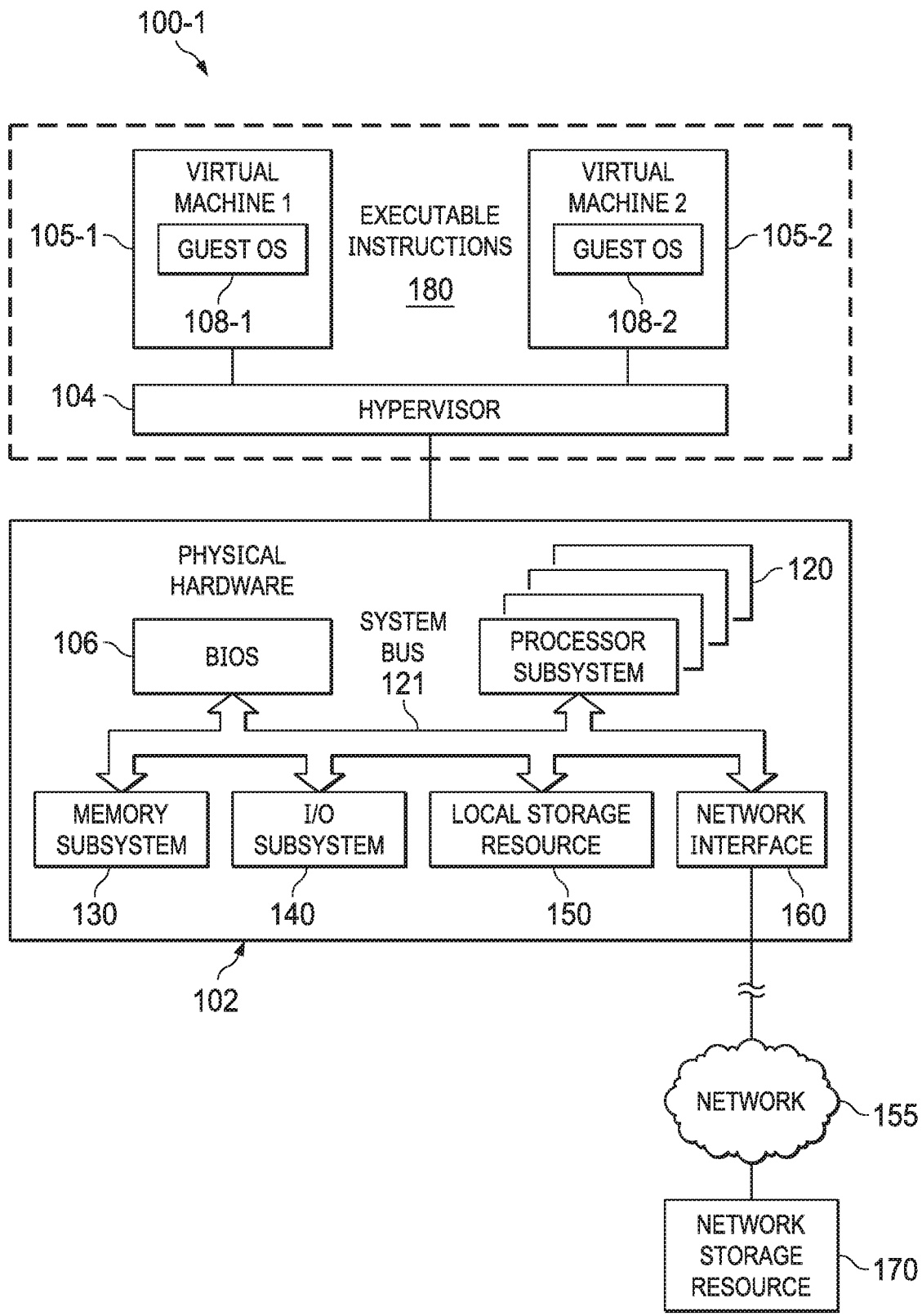
FIG. 1 illustrates a block diagram of selected elements of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

Referring now to the drawings, FIG. 1 illustrates a block diagram of selected elements of an example information handling system 100-1, in accordance with embodiments of the present disclosure. As depicted in FIG. 1, system 100-1 may represent an information handling system comprising physical hardware 102 and executable instructions 180 (including hypervisor 104 and one or more virtual machines 105). System 100-1 may also include external or remote elements, for example, network 155 and network storage resource 170.

As shown in FIG. 1, components of physical hardware 102 may include, but are not limited to, processor subsystem 120, which may comprise one or more processors, and system bus 121 that may communicatively couple various system components to processor subsystem 120 including, for example, a BIOS 106, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

Network interface 160 may comprise any suitable system, apparatus, or device operable to serve as an interface between information handling system 100-1 and network 155. Network interface 160 may enable information handling system 100-1 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in BIOS 106, memory subsystem 130, or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

BIOS 106 may include any system, device, or apparatus configured to identify, test, and/or initialize information handling resources of information handling system 100-1, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor subsystem 120 to carry out the functionality of BIOS 106. In these and other embodiments, BIOS 106 may comprise boot firmware configured to be the first code executed by processor subsystem 120 when information handling system 100-1 is booted and/or powered on. As part of its initialization functionality, code for BIOS 106 may be configured to set components of information handling system 100-1 into a known state, so that one or more applications (e.g., an operating system or other application programs) stored on compatible media (e.g., disk drives) may be executed by processor subsystem 120 and given control of information handling system 100-1.

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated information handling system, such as system 100-1, is powered down. In some embodiments, some or all of memory subsystem 130 may comprise persistent memory, such as one or more Non-Volatile Dual-Inline Memory Modules (NVDIMMs) configured to maintain persistence of data written to the persistent memory in the event of a power event in which electrical energy to the persistent memory is withdrawn.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. Likewise, network storage resource 170 may comprise computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 may comprise any suitable system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. In some embodiments, the virtualized hardware representation presented to each of virtual machines 105 may comprise a mutually exclusive (i.e., disjointed or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In some embodiments, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another virtual machine (not shown) may comprise a VXWORKS OS. Although system 100-1 is depicted as having two virtual machines 105-1 and 105-2, it will be understood that, in particular embodiments, different numbers of virtual machines 105 may be executing on system 100-1 at any given time.

In operation of system 100-1 shown in FIG. 1, hypervisor 104 of information handling system 100-1 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104.

Figure 2:
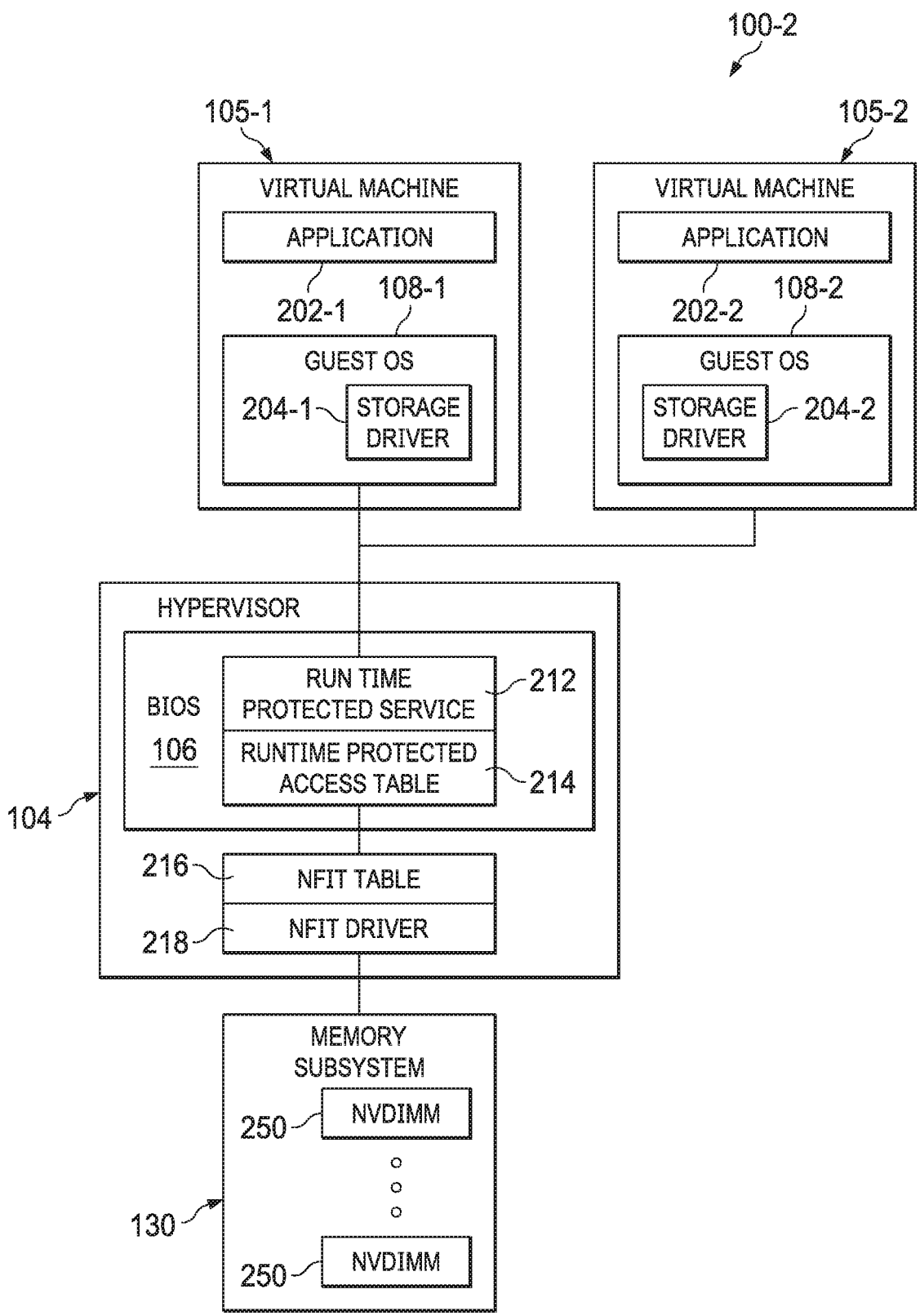
FIG. 2 illustrates a block diagram of selected elements of an example information handling system, in accordance with embodiments of the present disclosure.

FIG. 2 illustrates a block diagram of selected elements of an example information handling system 100-2, in accordance with embodiments of the present disclosure. In FIG. 2, system 100-2 may represent an information handling system that is an embodiment of system 100-1 (see FIG. 1). As shown, system 100-2 may include further details regarding the operation and use of components for implementing increased data security, while other elements shown in system 100-1 have been omitted from FIG. 2 for descriptive clarity.

As shown in FIG. 2, each virtual machine 105 (e.g., virtual machines 105-1 and 105-2) may execute an application 202 and a guest OS 108 under which a storage driver 204 may be installed and loaded. A storage driver 204 may enable a virtual machine 105 to access memory subsystem 130 via runtime protected service 212, runtime protected access table 214, NVDIMM Firmware Interface Table (NFIT) 216, and NFIT driver 218, all which may be loaded into hypervisor 104.

BIOS 106 as shown in FIG. 2 may execute within hypervisor 104 to execute runtime protected service 212 and implement runtime protected access table 214. Runtime protected service 212 and runtime protected access table 214 may provide interfaces to VM-facing I/O by hypervisor 104 to interact with a storage driver 204 executing on a virtual machine 105. NFIT table 216 may implement a file system, for example, for access by a guest OS 108. As shown in FIG. 2, NFIT table 216 may interact with NFIT driver 218, to access physical hardware including NVDIMMs 250 of memory subsystem 130.

Figure 3A:
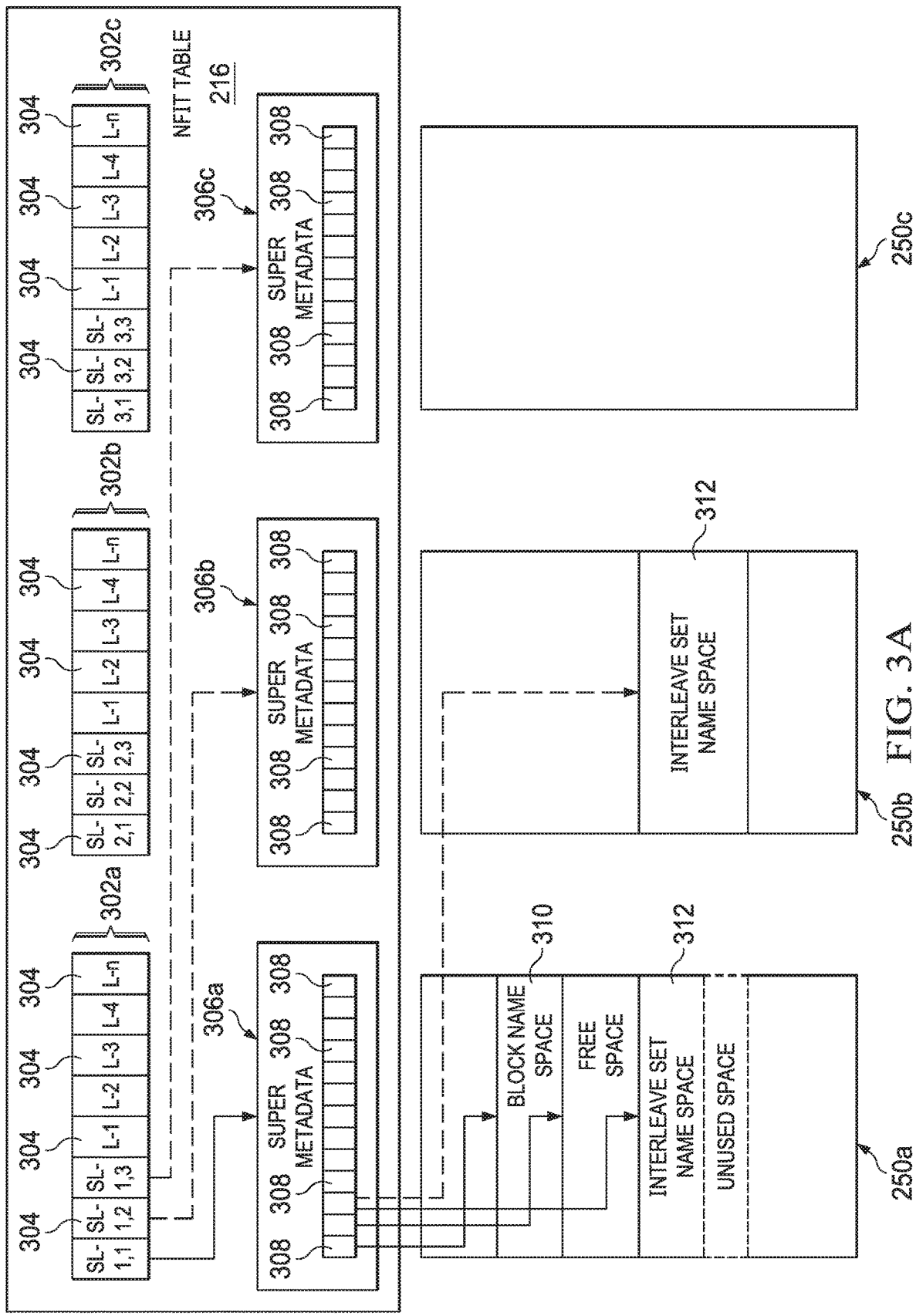
FIG. 3A illustrates a block diagram of selected elements of an example NFIT table and example NVDIMMs associated with metadata entries of the example NFIT table, in accordance with embodiments of the present disclosure.

FIG. 3A illustrates a block diagram of selected elements of an example NFIT table 216 and example NVDIMMs 250 associated with metadata entries of example NFIT table 216, in accordance with embodiments of the present disclosure. As shown in FIG. 3A, NFIT table 216 may include for each NVDIMM 250, an associated set 302 of super labels 304. For example, set 302a may be associated with NVDIMM 250a, set 302b may be associated with NVDIMM 250b, and set 302c may be associated with NVDIMM 250c. Each super label 304 may point to super metadata 306 associated with a respective NVDIMM 250. For example, super metadata 306a may be associated with NVDIMM 250a, super metadata 306b may be associated with NVDIMM 250b, and super metadata 306c may be associated with NVDIMM 250c. Each set of super metadata 306 may include one or more entries 308. Each entry 308 may define an individual namespace (e.g., block namespace 310, interleave set/persistent memory namespace 312) and may record offsets of the latest written data in a post-map logical block address, thus allowing super metadata 306 to also track free space out of the allocated space (e.g., unused space in interleave set/persistent memory namespace 312 of FIG. 3A).

Accordingly, NFIT table 216 may include a plurality of sets of super metadata 306 that point to multiple namespaces (e.g., 310, 312), wherein entries 308 of super metadata 306 track individual namespaces and addresses of latest-written data in order to keep track of unused space of allocated namespaces. The super label and super namespace area of NFIT table 216 may be unexposed to virtual machines 105, and may only be accessed through runtime protected service 212. Accordingly, as needed, runtime protected service 212 may update a namespace size without corrupting other relevant data and metadata.

Figure 3B:
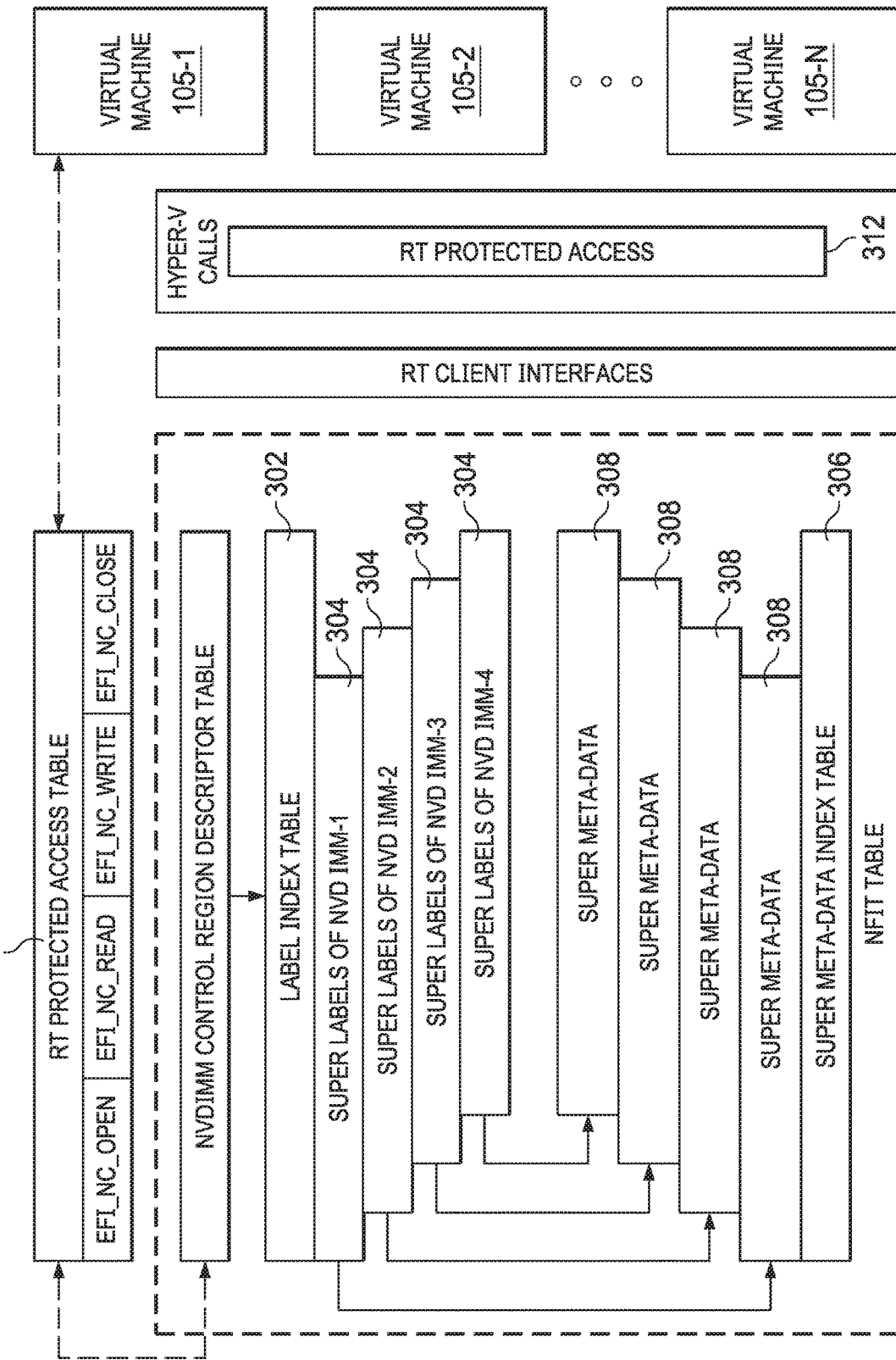
FIG. 3B illustrates a block diagram of mappings among selected elements of FIGS. 2 and 3A, in accordance with embodiments of the present disclosure.

FIG. 3B illustrates a block diagram of mappings among selected elements of FIGS. 2 and 3A, in accordance with embodiments of the present disclosure, further illustrating relationships and mappings among the various components.

Figure 4:
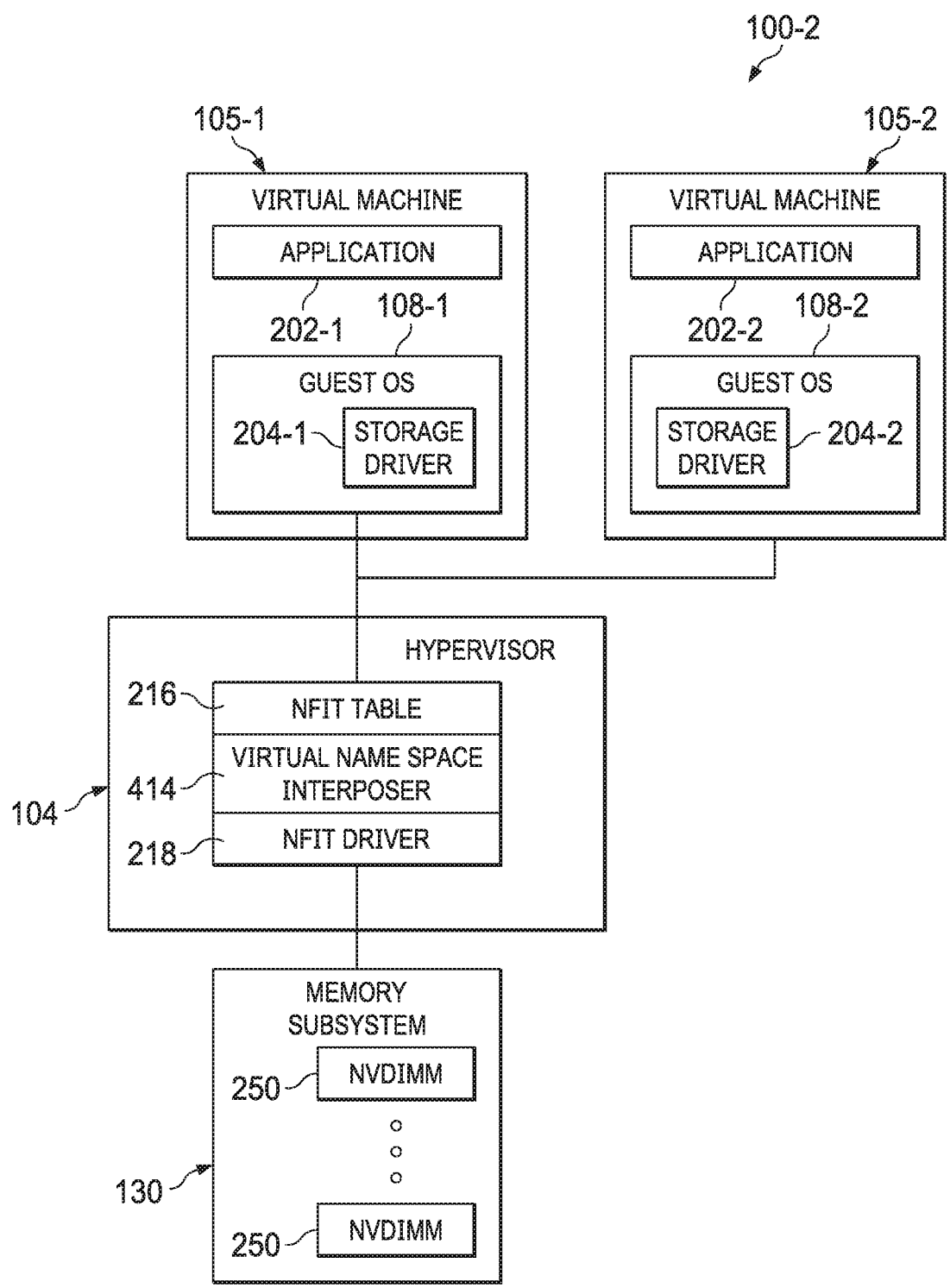
FIG. 4 illustrates a block diagram of selected elements of an example information handling system, in accordance with embodiments of the present disclosure.
Figure 5:
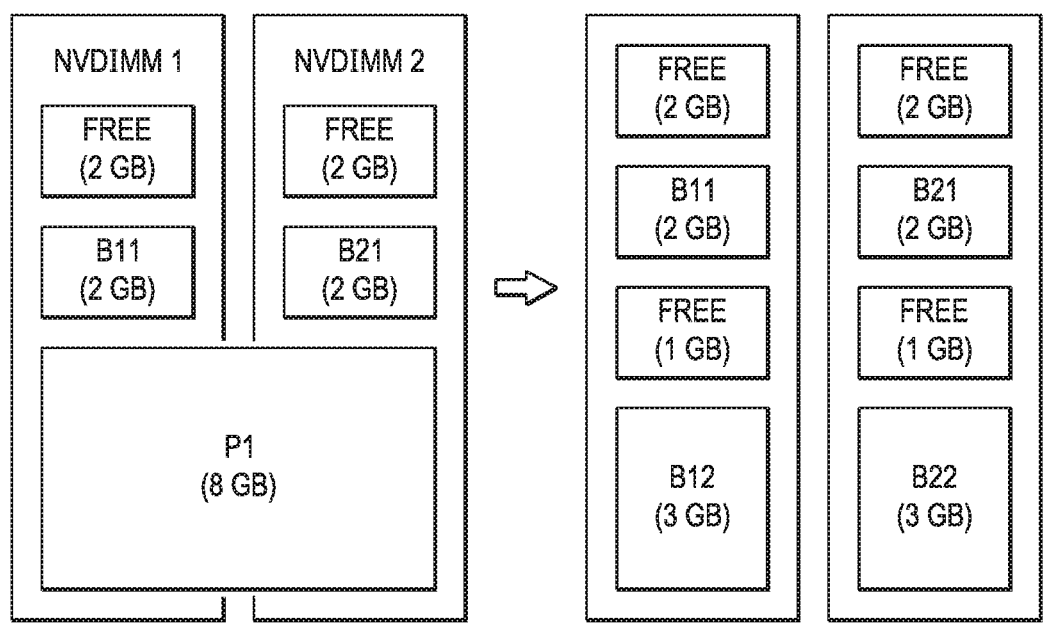
FIG. 5 illustrates an example of memory fragmentation that may occur in a memory system implemented using the NVDIMM Namespace Specification, as is known in the art.

FIG. 4 illustrates a block diagram of selected elements of an example information handling system 100-3, in accordance with embodiments of the present disclosure. In FIG. 4, system 100-3 may represent an information handling system that is an embodiment of system 100-1 (see FIG. 1). As shown, system 100-3 may include further details regarding the operation and use of components for implementing increased data security, while other elements shown in system 100-1 have been omitted from FIG. 4 for descriptive clarity.

As shown in FIG. 4, each virtual machine 105 (e.g., virtual machines 105-1 and 105-2) may execute an application 202 and a guest OS 108 under which a storage driver 204 may be installed and loaded. A storage driver 204 may enable a virtual machine 105 to access memory subsystem 130 via NVDIMM Firmware Interface Table (NFIT) 216, virtual namespace interposer 414, and NFIT driver 218, all which may be loaded into hypervisor 104. NFIT table 216 may implement a file system, for example, for access by a guest OS 108. As shown in FIG. 2, NFIT table 216 may interact with NFIT driver 218, to access physical hardware including NVDIMMs 250 of memory subsystem 130. Virtual mamespace interposer 414 may interface between NFIT table 216 and NFIT driver 218 to mitigate fragmentation of memory subsystem 130, as described below.

In operation, before any NVDIMM 250 is fragmented, virtual namespace interposer 414 may act as pass-through to namespace subsystems including NFIT table 216 and NFIT driver 218, forwarding namespace creation and namespace access requests. Once fragmentation occurs, virtual namespace interposer 414 may, for any namespace creation request received, create a collection of two or more block namespaces that satisfy the namespace creation request. For instance, turning to the example of FIG. 5 discussed in the Background section, virtual namespace interposer 414 may be able to satisfy a namespace creation request to create a namespace of 3 gigabytes, whether such new namespace is a persistent memory namespace or a block namespace. In response to a namespace creation request, virtual namespace interposer 414 may create a virtual namespace which maps to non-contiguous portions of NVDIMMs created as physical block namespaces. For example, referring to FIG. 5, the virtual namespace may be created which maps to the two-gigabyte portion of NVDIMM 1 shown on the right-hand side of FIG. 5 as "free" and the one-gigabyte of NVDIMM 2 shown on the right-hand side of FIG. 5 as "free."

Accordingly, virtual namespace interposer 414 may maintain an appropriate table to map driver-level requests of virtual namespaces to the corresponding physical namespace. For example, in response to an input/output request, virtual namespace interposer 414 may determine if the system physical address of the input/output request appears in the table maintained by virtual namespace interposer 414. If the system physical address appears in the table, virtual namespace interposer 414 may use the table to translate the system physical address into the actual namespace(s) associated with the virtual namespace. On the other hand, if the system physical address does not appear in the table, virtual namespace interposer 414 may simply pass through access to access the namespace identified in the system physical address.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
a memory subsystem; and
a processor subsystem communicatively coupled to the memory subsystem and configured to execute a hypervisor, wherein the hypervisor is configured to host a plurality of virtual machines and host an interface to the memory subsystem, wherein the interface is configured to dynamically modify sizes of namespaces instantiated within the memory subsystem by maintaining super metadata associated with each of a plurality of memory modules of the memory subsystem in an interface table that is accessible by the virtual machines only via a runtime protected service of the hypervisor;
wherein the super metadata for a particular memory module of the memory subsystem includes one or more entries for the particular memory module, each entry defining a namespace of the particular memory module and recording an offset of the latest written data in the namespace.

2. The information handling system of claim 1, wherein the plurality of memory modules comprise persistent memory modules.

3. The information handling system of claim 2, wherein the persistent memory modules comprise non-volatile dual-inline memory modules (NVDIMMs).

4. The information handling system of claim 3, wherein the super metadata is stored as one or more entries in an NVDIMM Firmware Interface Table.

5. The information handling system of claim 1, wherein super metadata is abstracted from the virtual machines by the runtime protected service.

6. A method comprising:
hosting on a hypervisor a plurality of virtual machines; and
hosting on the hypervisor an interface between a processor subsystem upon which the hypervisor executes and a memory subsystem communicatively coupled to the processor subsystem, wherein the interface is configured to dynamically modify sizes of namespaces instantiated within the memory subsystem by maintaining super metadata associated with each of a plurality of memory modules of the memory subsystem in an interface table that is accessible by the virtual machines only via a runtime protected service of the hypervisor;
wherein the super metadata for a particular memory module of the memory subsystem includes one or more entries for the particular memory module, each entry defining a namespace of the particular memory module and recording an offset of the latest written data in the namespace.

7. The method of claim 6, wherein the plurality of memory modules comprise persistent memory modules.

8. The method of claim 7, wherein the persistent memory modules comprise non-volatile dual-inline memory modules (NVDIMMs).

9. The method of claim 8, wherein the super metadata is stored as one or more entries in an NVDIMM Firmware Interface Table.

10. The method of claim 6, wherein super metadata is abstracted from the virtual machines by the runtime protected service.

11. An information handling system, comprising:
a memory subsystem; and
a processor subsystem communicatively coupled to the memory subsystem and configured to execute a hypervisor, wherein the hypervisor is configured to host a plurality of virtual machines, a file system, a hardware driver interface to the memory subsystem, and a virtual namespace interposer interfaced between the file system and the hardware driver;
wherein the hypervisor is further configured to maintain super metadata associated with each of a plurality of memory modules of the memory subsystem in an interface table that is accessible by the virtual machines only via a runtime protected service of the hypervisor;
wherein the virtual namespace interposer is configured to:
during an unfragmented state of the memory subsystem, pass through namespace creation requests and input/output requests to the memory subsystem; and
during a fragmented state of the memory subsystem:
in response to a request to create a new namespace, create the new namespace as a virtual namespace mapped to two or more non-contiguous physical block namespaces of the memory subsystem; and
in response to an input/output request to the memory subsystem:
determine if the input/output request is to a virtual namespace;
pass through the input/output request if the request is to a namespace other than a virtual namespace; and
translate the input/output request to map the virtual namespace to the two or more non-contiguous physical block namespaces of the memory subsystem making up the virtual namespace if the input/output request is to a virtual namespace.

12. The information handling system of claim 11, wherein the memory subsystem comprises persistent memory modules.

13. The information handling system of claim 12, wherein the persistent memory modules comprise non-volatile dual-inline memory modules (NVDIMMs).

14. The information handling system of claim 13, wherein the virtual namespace interposer is interfaced between an NVDIMM Firmware Interface Table and the hardware driver.

15. A method comprising, in a memory subsystem communicatively coupled to a processor subsystem configured to execute a hypervisor, wherein the hypervisor is configured to host a plurality of virtual machines, a file system, a hardware driver interface to the memory subsystem, and a virtual namespace interposer interfaced between the file system and the hardware driver, wherein the hypervisor is further configured to maintain super metadata associated with each of a plurality of memory modules of the memory subsystem in an interface table that is accessible by the virtual machines only via a runtime protected service of the hypervisor:
during an unfragmented state of the memory subsystem, passing through, by the virtual namespace interposer, namespace creation requests and input/output requests to the memory subsystem; and
during a fragmented state of the memory subsystem:
in response to a request to create a new namespace, creating, by the virtual namespace interposer, the new namespace as a virtual namespace mapped to two or more non-contiguous physical block namespaces of the memory subsystem; and
in response to an input/output request to the memory subsystem:
determining, by the virtual namespace interposer, if the input/output request is to a virtual namespace;
passing through, by the virtual namespace interposer, the input/output request if the request is to a namespace other than a virtual namespace; and
translating, by the virtual namespace interposer, the input/output request to map the virtual namespace to the two or more non-contiguous physical block namespaces of the memory subsystem making up the virtual namespace if the input/output request is to a virtual namespace.

16. The method of claim 15, wherein the memory subsystem comprises persistent memory modules.

17. The method of claim 16, wherein the persistent memory modules comprise non-volatile dual-inline memory modules (NVDIMMs).

18. The method of claim 17, wherein the virtual namespace interposer is interfaced between an NVDIMM Firmware Interface Table and the hardware driver.

* * * * *